(No Model.)
S. H. SHORT.
SPEED REGULATOR FOR ELECTRIC MOTORS.
No. 448,681. Patented Mar. 24, 1891.
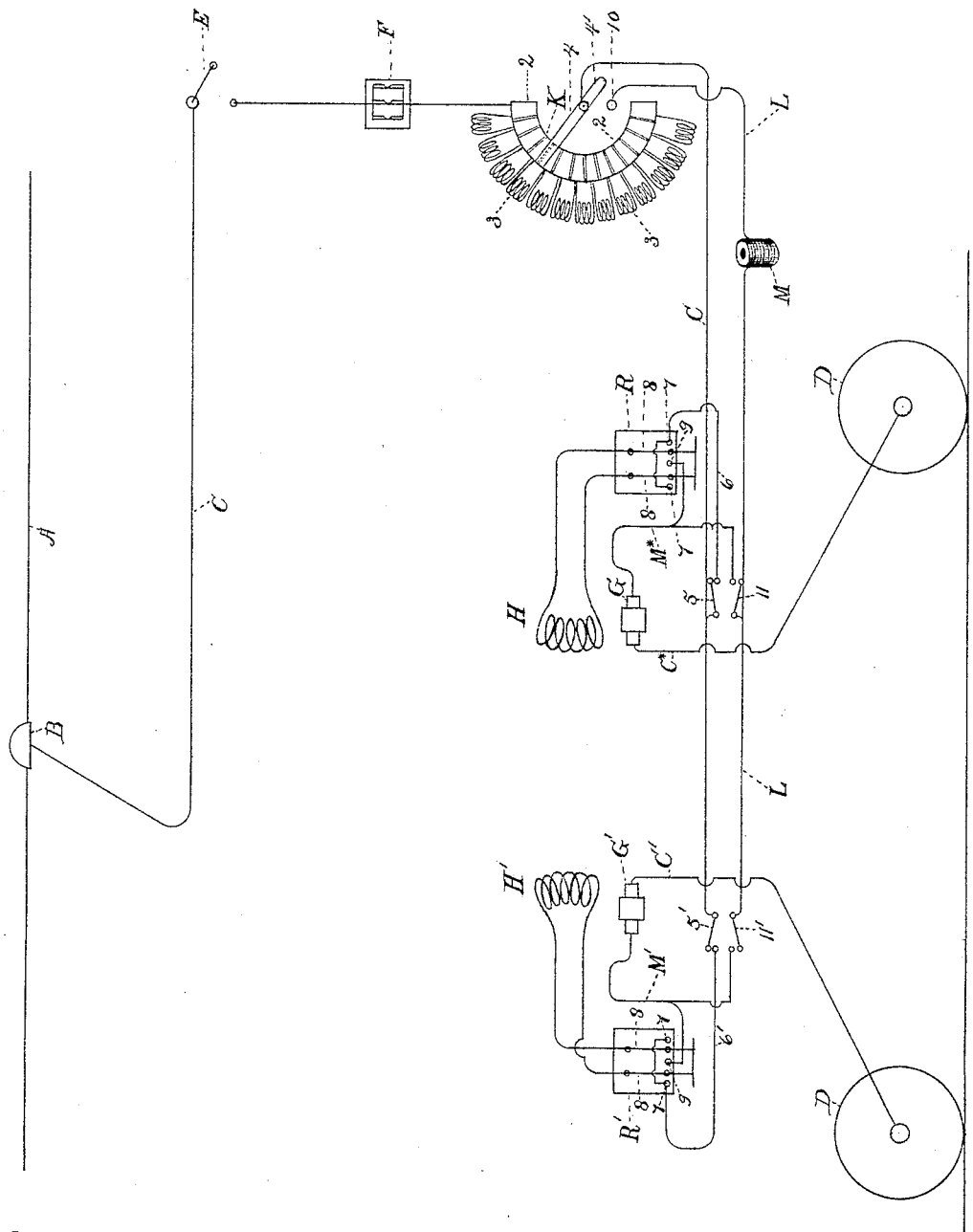

UNITED STATES PATENT OFFICE.

SIDNEY H. SHORT, OF CLEVELAND, OHIO, ASSIGNOR TO THE SHORT ELECTRIC RAILWAY COMPANY, OF SAME PLACE.

SPEED-REGULATOR FOR ELECTRIC MOTORS.

SPECIFICATION forming part of Letters Patent No. 448,681, dated March 24, 1891.

Application filed October 10, 1890. Serial No. 367,724. (No model.)

*To all whom it may concern:*

Be it known that I, SIDNEY H. SHORT, of Cleveland, in the county of Cuyahoga and State of Ohio, have invented certain new and useful Improvements in Speed-Regulators for Electric Motors; and I do hereby declare the following to be a full, clear, and exact description of the invention, such as will enable others skilled in the art to which it appertains to make and use the same.

This invention relates more particularly to the means for controlling the current of electricity supplied to the motors for propelling cars on electric railways, but the improvements constituting the same are included for all the uses to which they may severally be adapted.

Heretofore it has been customary to arrange an adjustable rheostat on the car in the conductor which supplies the electricity to the propelling motor or motors which have a field magnet or magnets in series with their armatures, so that by varying the resistance in said conductor more or less current may pass to the motor or motors to operate the same.

In accordance with the present invention a speed branch in the form of a shunt on the field, together with suitable means for cutting it in and out, is employed in connection with a series field in addition to an adjustable rheostat, the arrangement being such that the cutting in of the speed branch causes a fall of counter electro-motive force at the armature-brush. Consequently the cutting in of said branch increases the speed of the motor to again build up the counter electro-motive force lost by the reduction of the magnetic field.

The invention extends generally to the speed branch of the form and arrangement aforesaid; but it covers also some other or further improvements, as follows, which are included both severally and collectively.

Thus, first, the means for cutting in and cutting out the speed branch of the form and arrangement aforesaid are connected with the device or devices for adjusting the rheostat, so as to be controlled through said device or devices.

Second. The means for cutting in and cutting out the speed branch (of the form and arrangement aforesaid) are connected with the device or devices for adjusting the rheostat in such a way that a further movement of the said device or devices cuts in the speed branch after the resistance has been cut out.

Third. For cutting in and cutting out a speed branch (of the form and arrangement aforesaid or of any known or suitable form or arrangement) means are employed which cut in the speed branch without breaking what may conveniently be called the "normal" branch—that is to say, the circuit which existed prior to cutting in the speed branch. This improvement may be used with or without having the said means connected with the operating device or devices of the adjustable rheostat, so as to be controlled thereby. With such a control a contact-point for the field-branch is so arranged in reference to its switching-arm (or some substitute therefor) that it is touched by the latter while the switching-arm of the rheostat (or some substitute therefor) touches a contact-plate belonging to (or forming practically a continuation of a plate of) the rheostat.

Fourth. A speed branch is formed as a resistance-shunt, so that the current in the field-coils shunted by said branch is weakened but not stopped, the switching means for said branch being such as to leave the circuit closed through the shunted coils. Such a shunt may and preferably is applied around the whole series field, so that the speed branch may be easily applied to any ordinary motor having a series field without altering the winding at all. Further, a shunt on the whole field enables an ordinary reversing-switch to be employed on the field, and such an arrangement of reversing-switch in connection with a speed-shunt is included as a special feature of invention.

Fifth. It is often (if not generally) desirable to employ more than one motor on a car and to regulate both (or all) by the same means. Such an arrangement is included in the present invention, the adjustable rheostat being in circuit with both motors and the speed branch being extended around series field-coils of each. Preferably each motor is further provided with its individual switching means for completing the shunt on its own field, as well as for making and breaking the normal circuit thereof. The motors are thus rendered independent of each other.

The accompanying drawing, which forms part of this specification, is a diagram of part of the electrical apparatus on a car or vehicle sufficient to illustrate the present invention in what is considered its best form.

A is a conductor charged with electricity, as from a dynamo at the central station, and B a trolley or traveler for taking the electricity from the conductor as the car moves along; but neither the particular source of the electricity (whether inside or outside the car) nor the means for supplying it forms part of the invention. As shown, the conductor C on the vehicle, leading from the trolley B, is grounded through the wheels D of the vehicle. In said conductor are a switch E and a fuse-box F, as well as the propelling-motors G H and G' H' (G G' being the armatures and H H' the field-coils in series with said armatures) and the regulating and reversing means for the motors and their individual switches.

The ordinary adjustable rheostat K is shown. It consists of a series of contact-plates 2, with resistance-coils 3, and a switch-arm 4, traveling over the plates 2. The conductor C includes the rheostat, the end of one section being electrically connected with an end plate 2 and the beginning of the succeeding section with the switch-arm 4, so that as the said arm travels over the plates it successively connects the coils 3 in the circuit of conductor C or cuts them out, according to the direction of movement. From the switch-arm 4 the conductor C extends to the switches 5 5', (one for each motor,) which connect it through wires 6 6' with the points 7 of the respective reversing-switches R R', (one for each motor.)

The switch-arms 8 of each reversing-switch are connected with the ends of the field-coils H or H' of the corresponding motor, and the points 9 of the reversing-switches are each connected with one brush of the corresponding armatures G G', respectively, the other brush being put to ground through the wire C* or C' and the vehicle-wheels D. As so far described, therefore, the motors G H and G' H' are in multiple arc or parallel with each other and in series with the adjustable rheostat K.

The speed branch L is shown as a shunt extending around the series fields H H' of both motors and including a resistance M to prevent it from short-circuiting the field. It extends from the contact-point 10 to the switches 11 11', (one for each motor,) where it branches, one part or sub-branch being connected with the positive brush of each motor through a wire M* M', respectively.

The switching-arm 4 of the rheostat K is shown as provided with an extension 4', which forms a switching-arm for connecting the point 10 with the conductor C, so that electricity therefrom may pass through the speed branch L around the series fields H H' to the armatures G G'. When the speed branch is connected in, the counter-electro-motive force at the motor-brushes at once falls on account of the diminished strength of the field-magnets. At the same time the diminution of current in the field-coils shunted by said branch is not sufficient to prevent the increased current flowing through the armatures G G' from imparting a higher speed thereto. As shown, the contact-point 10 is placed in the path of the arm 4' (which moves with the switch-arm 4 for adjusting the resistance of the rheostat) at the place to which the said arm 4' is moved when the arm 4 has cut out the resistance-coils 3. The speed branch is cut in, therefore, when the resistance of the normal branch (which includes the field-coils H H') has been reduced. Preferably the end plate 2, with which the conductor C is permanently connected, is made broad, so that the switch-arm 4 may move over it for some distance after it has made contact therewith, and the contact-point 10 is arranged to be touched by the switch-arm 4' to close the speed branch after the arm 4 has made good contact with said end plate.

Having fully described my invention, what I claim as new, and desire to secure by Letters Patent, is—

1. The combination, with an electric motor and an adjustable rheostat, of a speed branch composed of a resistance-shunt on the field and switching means for said branch controlled by the means for adjusting the rheostat and arranged to send current through said branch when the rheostatic resistance is reduced or cut out, substantially as described.

2. The combination, with an electric motor and an adjustable rheostat, of a speed branch composed of a resistance-shunt around the whole series field, switching means for said branch, and a reversing-switch for the said field, substantially as described.

3. The combination, with a number of electric motors, of an adjustable rheostat in series with all said motors, a speed branch forming a shunt on the series field of each motor, and switching means for said branch, substantially as described.

4. The combination, with a number of electric motors, of an adjustable rheostat, a speed branch, switching means for said branch, and individual switches for each motor, substantially as described.

5. The combination, with a number of series electric motors in multiple-arc branches of the main line, of a speed shunt-line around all the motors and branches from the speed-line, each including the armature of a motor and shunting the field of the same, and a switch for each motor for closing the shunt branch, substantially as described.

6. The combination, with a number of series electric motors in multiple-arc branches of the main line and a speed shunt-line around all the motors, of branches from the speed-line, each including the armature of a motor and shunting the field of the same, and a reversing-switch for each motor, substantially as described.

7. The combination, with a charged main line and a number of series electric motors in multiple-arc branches thereof, of a rheostat in the main line, a speed shunt-line around all the motors normally open at the rheostat, branches from the shunt-line, including the armatures of the motors, and a switch-lever for the rheostat arranged to close the speed shunt-line when all resistance is cut out, substantially as described.

In testimony whereof I have signed this specification in the presence of two subscribing witnesses.

SIDNEY H. SHORT.

Witnesses:
A. B. CALHOUN,
W. A. PALLANT.